United States Patent
Zhang et al.

(10) Patent No.: US 7,656,792 B2
(45) Date of Patent: Feb. 2, 2010

(54) METHOD AND APPARATUS FOR COMPUTING ALTERNATE MULTICAST/BROADCAST PATHS IN A ROUTED NETWORK

(75) Inventors: Hong Zhang, Kanata (CA); Guoli Yin, Nepean (CA); Peter Ashwood Smith, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 400 days.

(21) Appl. No.: 11/713,499

(22) Filed: Mar. 2, 2007

(65) Prior Publication Data

US 2008/0107018 A1    May 8, 2008

Related U.S. Application Data

(60) Provisional application No. 60/856,092, filed on Nov. 2, 2006.

(51) Int. Cl.
*G01R 31/08* (2006.01)

(52) U.S. Cl. ........................... 370/228; 370/256

(58) Field of Classification Search ............. 370/228, 370/216, 217, 242, 244, 390, 432, 256, 408, 370/237, 238
See application file for complete search history.

(56) References Cited

U.S. PATENT DOCUMENTS 5,581,543 A    12/1996  Natarajan
6,671,819 B1   12/2003  Passman et al.
7,035,937 B2   4/2006   Haas et al.
2004/0073700 A1  4/2004  Chaudhuri
2005/0088965 A1* 4/2005  Atlas et al. ............... 370/216
2005/0265398 A1* 12/2005 Chapman et al. .......... 370/509
2006/0018335 A1* 1/2006  Koch et al. ................ 370/432
2007/0019646 A1* 1/2007  Bryant et al. ............. 370/390
2008/0095160 A1* 4/2008  Yadav et al. .............. 370/390
2008/0170550 A1* 7/2008  Liu et al. .................. 370/338

FOREIGN PATENT DOCUMENTS

EP    0939560 A1    2/1998
WO    WO0177830 A1  10/2001

* cited by examiner

*Primary Examiner*—Brian D Nguyen
(74) *Attorney, Agent, or Firm*—Anderson Gorecki & Manaras LLP

(57) ABSTRACT

Alternate multicast/broadcast paths may be calculated in a routed network to enable broadcast/multicast traffic to be transmitted around a local failure in the routed network until the routing system reconverges on a new network topography. According to an embodiment of the invention, the nodes on a multicast tree or a broadcast tree may compute alternate paths for each of the downstream nodes in the multicast/broadcast tree or for select nodes in the multicast/broadcast tree. The select nodes may be those nodes that have advertised membership in the multicast or a set number of hops downstream on the branch affected by the failure. The alternate paths may be unicast paths from the node to the other nodes on the multicast/broadcast tree. U-turn nodes may be used where there is no regular loop-free alternate network path to a node on the downstream multicast/broadcast tree.

17 Claims, 5 Drawing Sheets

METHOD AND APPARATUS FOR COMPUTING ALTERNATE MULTICAST/BROADCAST PATHS IN A ROUTED NETWORK

CROSS REFERENCE TO RELATED APPLICATIONS

This application claims the benefit of U.S. Provisional Application No. 60/856,092, filed Nov. 2, 2006, entitled "Broadcast/Multicast Protection Using Link State Topology in a Bridged Network," the content of which is hereby incorporated herein by reference.

BACKGROUND OF THE INVENTION

1. Field of the Invention

The present invention relates to communication networks and, more particularly, to a method and apparatus for computing alternate multicast/broadcast paths in a routed network.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing Protocol Data Units (PDUs), such as Internet Protocol (IP) packets, Ethernet frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

There are several different types of network routing protocols, one class of which is commonly referred to as link state routing protocols. Link state routing protocols assign cost metrics to each link on the network, and the routers advertise the links and costs through the use of link state advertisements. The routers collect the link state advertisements and build a link state database containing information associated with links on the network. This network view enables the routers to compute lowest cost paths through the network to intended destinations. These calculations are performed in advance and then programmed into the data plane of the network element. In operation, when a PDU arrives, the data plane will automatically forward the PDU over the lowest cost path toward its intended destination. Several examples of routing protocols that operate in this manner include Intermediate System to Intermediate System (IS-IS) and Open Shortest Path First (OSPF), although other link state routing protocols exist and may be developed as well.

Network failures, such as link failures and node failures, may occur in a communication network. When a failure occurs, traffic that is intended to flow through the failure must be routed around the failure so that it is able to traverse the network. Many different ways of handling network failures have been devised over the years. For particular types of traffic, it is generally considered desirable or necessary to enable traffic to be switched to an alternate path with 50 milliseconds of failure on the primary path, so that real time traffic being carried by the network is not affected by the failure. While this is generally possible using physical layer protection switching, such as by switching traffic to a protection path using SONET equipment, it would be advantageous to be able to provide this type of protection at the routing layer.

When a failure occurs in a network implementing a link state routing protocol, the local router will react to the failure by generating and flooding new routing updates to other routers in the network, perhaps after a hold-down delay. Upon receipt of the routing update, all the routers in the network will re-compute routes through the network based on the new network topology. These routers will then load the revised forwarding tables into the forwarding hardware. The convergence time for this process to complete may last for several seconds. Accordingly, use of the link state routing protocol to provide sub-50 ms failure recovery by itself is generally not tenable.

One relatively recent way to provide fast failover to an alternate path is through the use of pre-computed alternate paths. For example, when the router initially computes a path to a destination, the router may also assume a failure on its primary path and compute an alternate path to the destination at the same time. The alternate path may then be programmed into the data plane of the network element so that, if a failure on the primary path occurs, the alternate path may be used to forward traffic temporarily while new primary paths are being computed.

FIG. 1 shows a simplified example of a network 10 including six nodes 12 interconnected by links 14. The cost of the links in this figure will be assumed to be symmetric, and are shown as numbers on the links. In an actual implementation, the network may be much larger and include a larger number of nodes. In this example, traffic is flowing from R1 to R6. Initially, a shortest path 20 from R1 to R6 will be through nodes R2 and R3, since this path has a cost of 4.

FIG. 2 shows the network of FIG. 1 in which there has been a failure on the link between R2 and R3. Although R2 will sense the failure, R1 will not know of the failure and will continue to send traffic to R2 to be forwarded to R6. To enable R2 to continue to forward traffic to R6, R2 will have pre-computed an alternate path through the network and have programmed that alternate path into its data plane. For example, in the example shown in FIG. 2, the pre-computed alternate path may be to transmit the data to R4, which may then transmit the data to the destination (R6) over its own shortest path.

The failure on the link from R2 to R3 will eventually be advertised by R2 using a standard Link State Advertisement (LSA), so that each of the nodes on the network may recompute paths through the network using the updated network information. These new paths will then be used by the network elements in a standard manner. For example, since the path from R1 to R6 via R4 and R5 has a cost of 6, R1 will stop sending R2 traffic intended for R6 once the new paths are computed and installed by the network elements. Having pre-computed alternate paths, however, enables the network elements to continue forwarding traffic to intended destinations while the network nodes recompute new primary paths through the new network topography.

To determine which paths are able to be used to forward traffic in this manner, each router must determine which neighbors are loop free. In the networks shown in FIGS. 1 and 2, R4 is loop free because the distance from R4 to R6 is less than the distance from R4 to R2 plus the distance from R2 to R6. Stated another way, when R2 sends traffic to R4 to be forwarded to R6, R2 needs to know that the shortest path from R4 to R6 does not require R4 to forward traffic back through R2. Since R4 will not know of the failure on the link from R2 to R3, having R4 return the traffic to R2 would cause a routing loop to occur, and would defeat the purpose of trying to send out the traffic to R6 via an alternate path through the network. Accordingly, for alternate paths, each router must determine which of its neighbors has a lowest cost path to a particular destination that does not cause traffic to be forwarded back through it, i.e., the nodes must determine which neighboring routers are on loop free paths to the intended destination.

Additionally, the nodes may preferentially select from available loop free neighbors for example by determining which neighbor's shortest path to the destination avoids the immediate downstream node R3. Selection of alternate paths is described in greater detail in U.S. patent application Ser. No. 11/410,747, filed Apr. 25, 2006, entitled Method and Apparatus for Simplifying the Computation of Alternate Network Paths, the content of which is hereby incorporated herein by reference. Selection of alternate network paths is also described in greater detail in U.S. Patent Application Publication No. US2005/0073958A1, the content of which is also hereby incorporated herein by reference.

FIG. 3 shows an example where it will be assumed that R2 does not have any loop-free neighbors. In this case, R2 may be able to use router R1 as its alternate path if router R1 is configured to enable U-turns to occur in the event of a failure on the network. Enabling U-turns of this nature is also described in greater detail in U.S. Patent Application Publication No. US2005/0073958A1, the content of which is hereby incorporated herein by reference. Essentially, U-turns enable the number of source/destination pairs that are protected on the network to be increased. To enable U-turns, R1 must be capable of breaking U-turns, and must have a loop free node-protecting alternate path to reach the destination.

To enable a node to determine which neighbor should be used as the first hop in an alternate path to a particular destination, the node will run an algorithm such as the well-known Dijkstra algorithm rooted at the neighbor, to enable it to determine the shortest path from the neighboring node to the destination.

Although these techniques are well know for computing alternate routes for unicast paths, a mechanism has yet to be defined that will enable alternate paths to be implemented for broadcast and/or multicast traffic. Accordingly, it would be advantageous to provide a way to compute alternate multicast/broadcast paths in a routed network.

SUMMARY OF THE INVENTION

Alternate multicast/broadcast paths may be calculated in a routed network to enable broadcast/multicast traffic to be transmitted around a local failure in the routed network until the routing system reconverges on a new network topography. According to an embodiment of the invention, the nodes on a multicast tree or a broadcast tree may compute alternate paths for each of the downstream nodes in the multicast/broadcast tree or for select nodes in the multicast/broadcast tree. The select nodes may be those nodes that have advertised membership in the multicast or a set number of hops downstream on the branch affected by the failure. The alternate paths may be unicast paths from the node to other downstream nodes participating in the multicast/broadcast tree. U-turn nodes may be used where there is no regular loop-free alternate network path to a node on the downstream multicast/broadcast tree.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
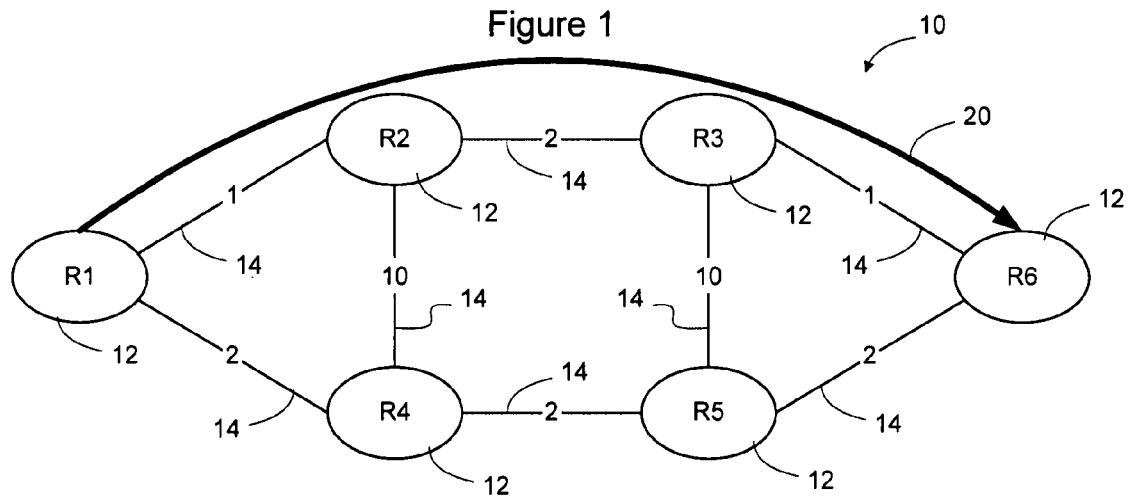
FIG. 1 is a functional block diagram of a portion of an example communication network showing an initial path through the network.
Figure 2:
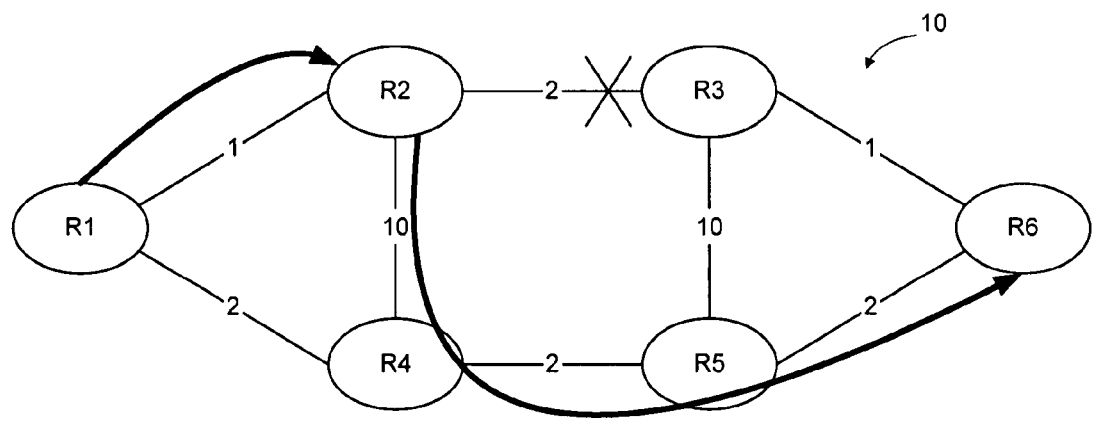
FIG. 2 is a functional block diagram of the network of FIG. 1 showing an alternate path through the network via a neighboring node.
Figure 3:
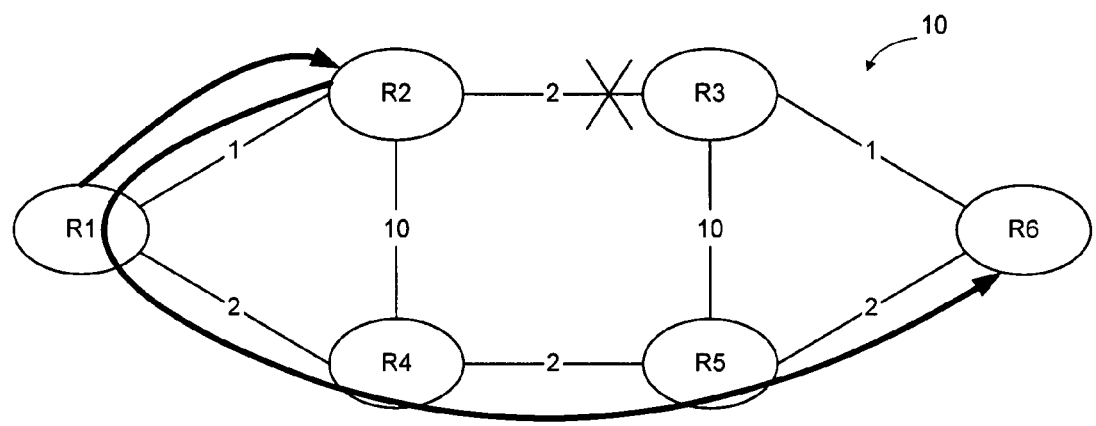
FIG. 3 is a functional block diagram of the network of FIG. 1 showing an alternate path through the network that relies on a U-turn.
Figure 4:
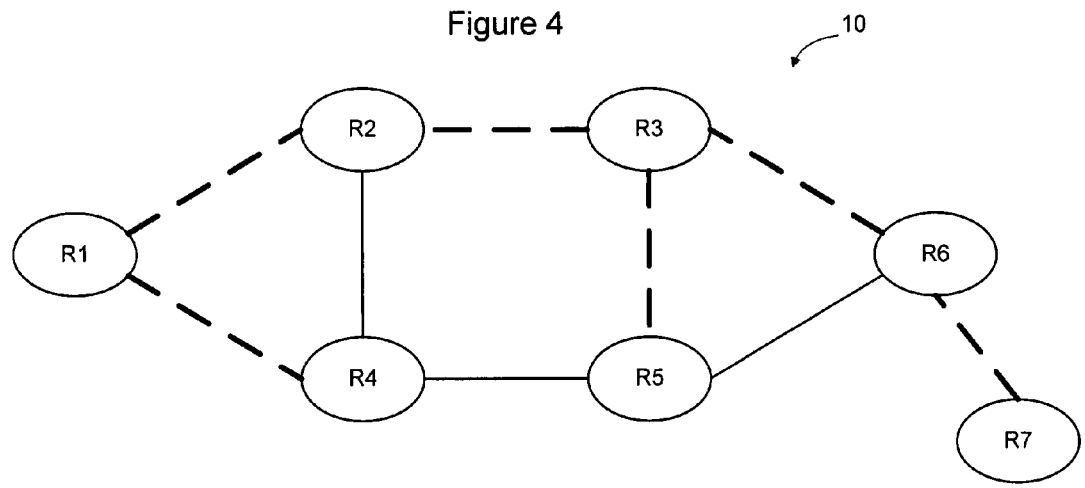
FIG. 4 is a functional block diagram of a portion of an example communication network showing a multicast tree on the network.

FIG. 4 illustrates an example multicast tree that may be established to forward PDUs on a network such as the network of FIG. 1. In the following discussion it will be assumed that a routing protocol, such as Open Shortest Path First (OSPF) or Intermediate System to Intermediate System (IS- IS) is in use on the network to enable routes to be established through the network. For example, if the nodes on the network exchange link state advertisements, the nodes will each have a link state database reflecting the current interconnection between the nodes and the link cost for links extending between the nodes. Based on the link state database, each node in the network will be able to compute whether it is on a shortest path between a pair of nodes. Thus, multicast/broadcast shortest path trees may be established, rooted at a given node (such as router R1 in FIG. 4), to enable traffic to be forwarded from that node to all other nodes on the network.

If a failure occurs on a link in the multicast tree, such as if the link interconnecting R2 with R3 fails, the failure affects not only the immediate downstream node but all other downstream nodes on the tree. Specifically, the failure of the link from R2 to R3 will cause PDUs to not be forwarded on the multicast tree to all the nodes on the branch that passes over the link from R2 to R3 which, in FIG. 4, includes nodes R3, R5, R6, and R7. According to an embodiment of the invention, each node on the multicast/broadcast tree will calculate an alternate path to each downstream node in the multicast/broadcast tree and install a unicast alternate path to those downstream nodes for use in the event of a failure. According to another embodiment of the invention, each node on the multicast tree calculates alternate paths to the downstream node on the opposite end of the failing link and all nodes one level further downstream from the immediate downstream node. These alternate network paths are used to unicast traffic to the immediate and next adjacent downstream nodes where the traffic is allowed to rejoin the multicast tree.

According to yet another embodiment of the invention, where multicast membership is communicated through the exchange of link state advertisements, each node on the network will have complete knowledge of which nodes on the network have advertised membership in a particular multicast. Since the upstream node knows the nodes that are members of the multicast, as opposed to transit nodes on the multicast, the upstream node may create unicast routes to those end nodes that have advertised membership in the multicast. Establishment of multicast trees via link state advertisements is described in greater detail in U.S. patent application Ser. No. 11/702,263 entitled Multicast Implementation in a Link State Protocol Controlled Ethernet Network, the content of which is hereby incorporated herein by reference.

The particular method selected to back up a tree may depend on the sparseness of the tree, i.e. on the number of downstream nodes on a given branch and on other factors. Optionally, the original multicast traffic may be encapsulated using the unicast header so that the original traffic may be extracted by a downstream node and forwarded on the multicast tree as if a failure had never occurred. The invention is not limited to an embodiment in which the traffic is encapsulated on the alternate paths, however, as the traffic may be tunneled between the upstream and downstream nodes in other ways as well. For example, it is possible to overwrite the destination address, store the original destination address in the source address, and unicast the packet downstream. The receiving nodes may reverse the process and use context to rebuild the original source address. Other context-based methods may also be used to enable the downstream nodes to recover the original header from the headers used to transport the packets around the failure on the multicast/broadcast tree. Different embodiments of the invention may therefore be implemented in different ways using different techniques to forward the packets between the upstream and participating downstream nodes.

Figure 5:
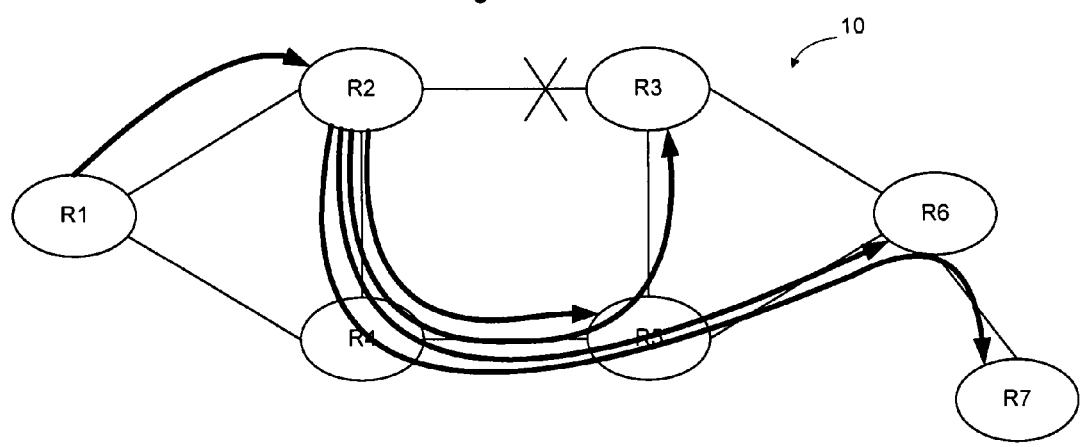
FIG. 5 is a functional block diagram of the network of FIG. 4 showing a set of alternate paths through the network to all nodes downstream of a failure on the multicast tree.

FIG. 5 illustrates an example in which the link from R2 to R3 has failed. In the example shown in FIG. 5, it will be assumed that R4 is an acceptable loop free alternate to all other nodes on the failing branch. Specifically, it will be assumed in this example that R4 is able to forward traffic to one or more of the downstream nodes on the branch because a shortest path from R4 to the downstream branch node does not cause traffic to flow through R2.

As shown in FIG. 5, the node R2 is able to calculate the shortest path tree to all nodes on the network, and knows the branch of the tree that flows through it. Thus, R2 can determined from the link state database (and optionally via flooded multicast membership) which nodes are on a branch of the tree that is connected via the link between R2 and R3. In the embodiment shown in FIG. 5, the node R2 will calculate an alternate path for each downstream node so that R2 is able to unicast traffic to each downstream node on the tree that may be affected by the failure of link between R2 and R3.

Figure 6:
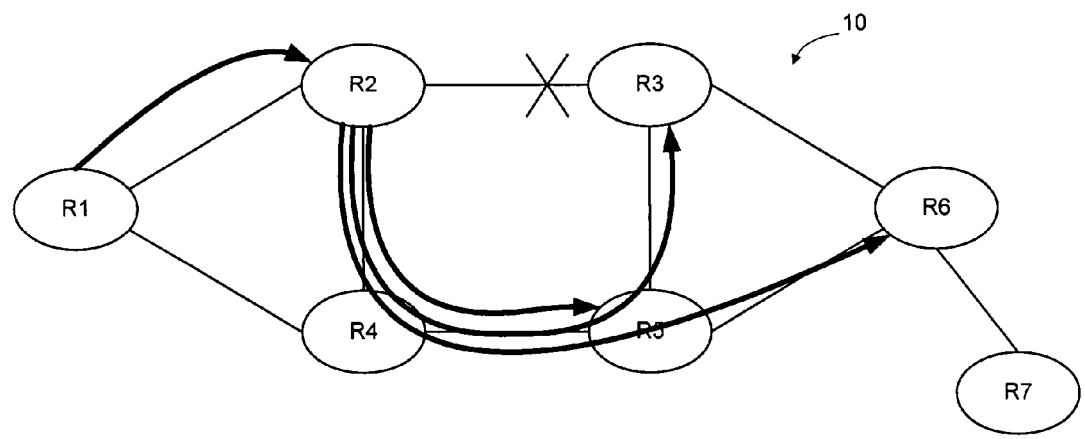
FIG. 6 is a functional block diagram of the network of FIG. 4 showing a set of alternate paths through the network to select downstream nodes to be used upon occurrence of a failure on the multicast tree.

In the example shown in FIG. 6, the node R2 will determine an alternate path for the downstream node on the other end of the failing link which, in this example, is node R3. Additionally, since the reason for the failure on the link from R2 to R3 may actually be a failure of the downstream node R3, the upstream node R2 will calculate an alternate network path to the next set of downstream nodes R5 and R6 on the branch that is experiencing failure. The upstream node R2 will unicast data on these alternate paths to cause the data to circumvent the failure and rejoin the multicast tree. Node R3, upon receipt of the data, will use the data. The nodes that are one hop downstream from node R3 will forward the data on the multicast tree as if a failure hadn't occurred to cause the data to follow the multicast tree to reach the nodes on the network that are members of the multicast/broadcast.

Figure 11:
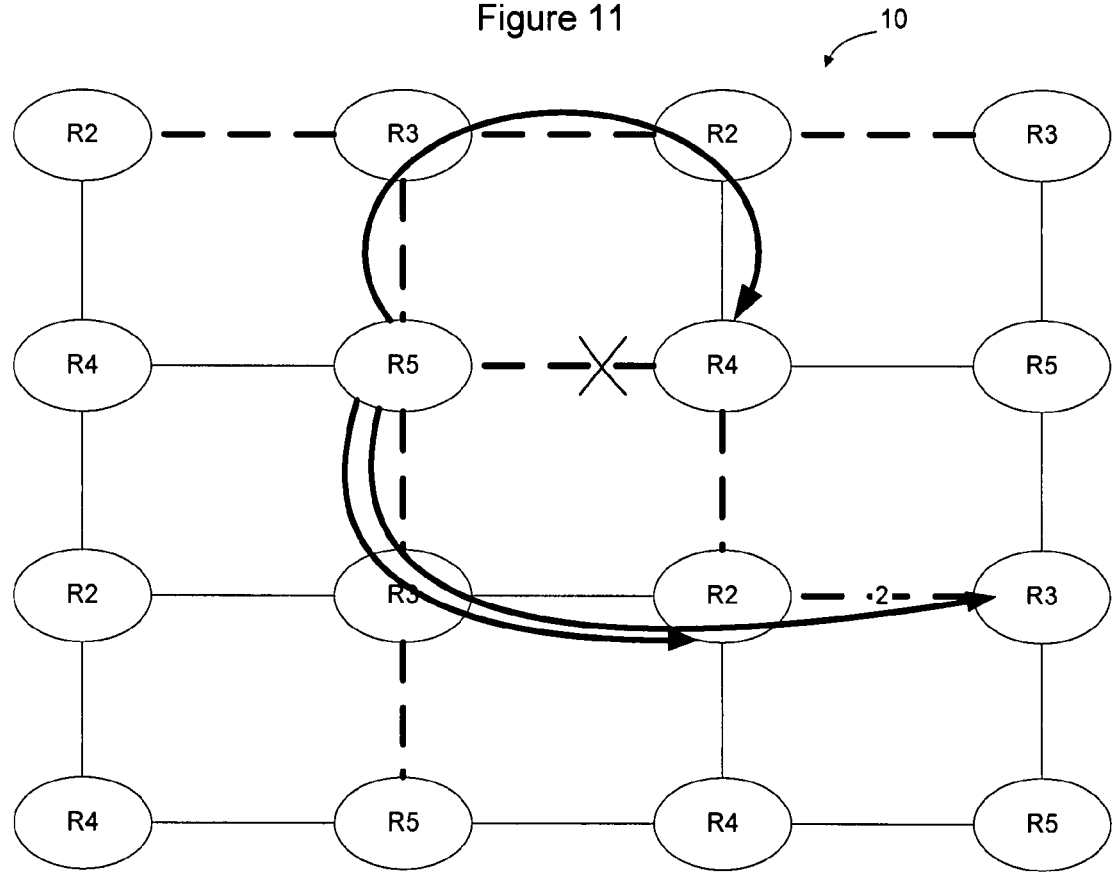
FIG. 11 is a functional block diagram of an example network showing a set of alternate network paths that use multiple neighbors to reach selected downstream nodes on the multicast/broadcast tree.

In the example shown in FIGS. 4-6, it was assumed that node R4 would be able to provide an alternate network path for all subsequent nodes in the tree. That may not be the case in all instances, and the invention is not limited in this regard. Thus, for example as shown in FIG. 11, the upstream node may need to select more than one neighbor as an alternate to unicast traffic to all of the downstream nodes or to the select downstream nodes depending on the manner in which the alternate path selection process is implemented.

Figure 7:
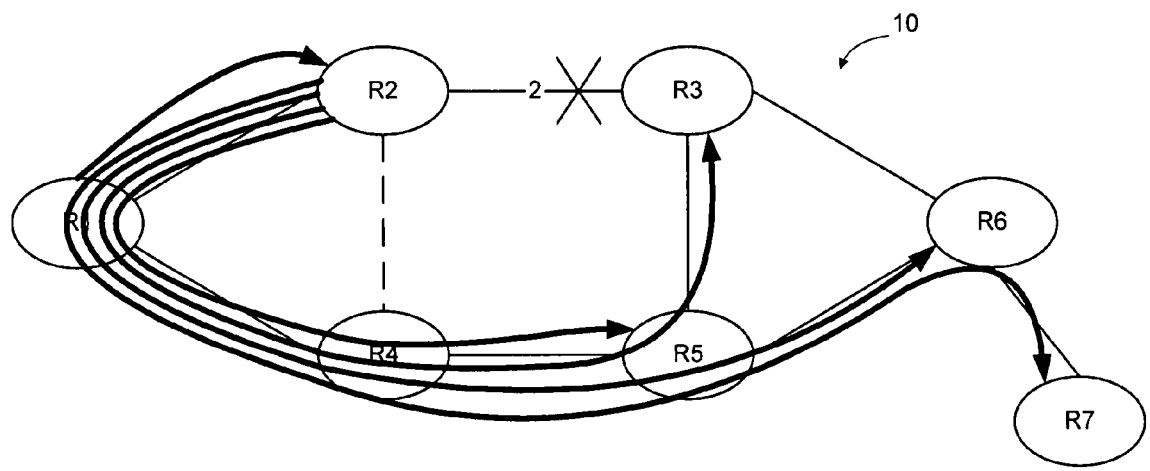
FIG. 7 is a functional block diagram of the network of FIG. 4 showing a set of U-turn alternate paths through the network to all nodes downstream of a failure on the multicast tree.
Figure 8:
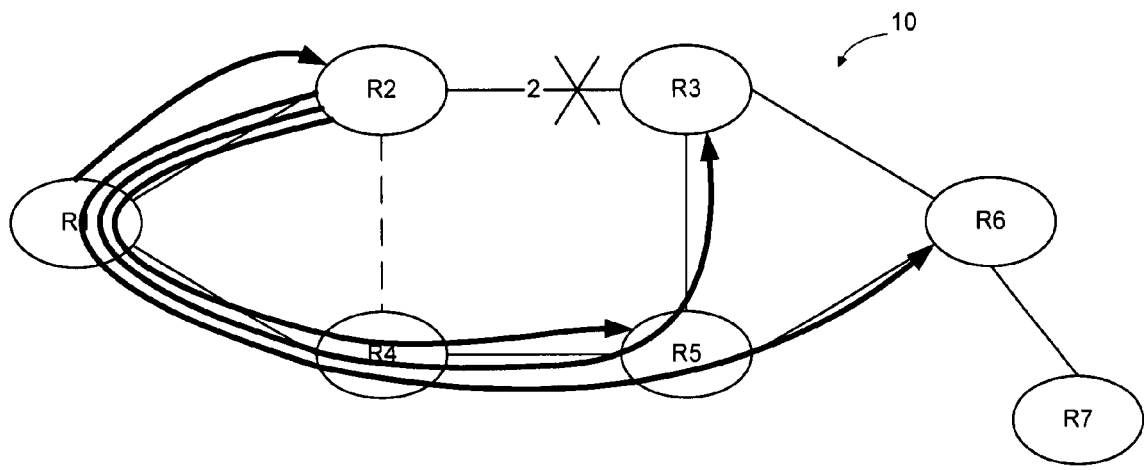
FIG. 8 is a functional block diagram of the network of FIG. 4 showing a set of U-turn alternate paths through the network to select downstream nodes to be used upon occurrence of a failure on the multicast tree.

FIGS. 7 and 8 illustrate examples of an embodiment in which U-turn alternates are able to be used to implement alternate network paths for downstream nodes in a multicast/broadcast tree. FIG. 7 illustrates the example in which R2 finds a unicast alternate network path for each downstream node, and FIG. 8 illustrates an embodiment in which R2 finds a unicast alternate network path for the immediate downstream node and the next set of downstream nodes after that, after which time the traffic rejoins the multicast/broadcast tree.

To enable U-turn neighbors to be used to implement unicast alternate paths for the multicast/broadcast tree, the upstream node must be capable of breaking a U-turn such that the node is able to recognize that the PDUs received on the network are from a node that is on a shortest path to the destination. In this event, the node will recognize that there is a failure on the network and send the PDU out over an alternate path to the intended destination. Alternatively, where source checking such as where a reverse path forwarding check is in use to prevent loops from forming, a U-turn flag may be used to indicate that the PDU was intentionally transmitted back to the U-turn neighbor and was not returned as a result of an inadvertent routing loop.

In the preceding examples, it has been assumed that unicast alternate paths should be used to implement the alternate paths upon a failure of a link/node on a multicast/broadcast tree. Once the failure has been propagated through the network, an alternate multicast tree will be established that circumvents the failed link/node so that the unicast alternate paths need only be used temporarily until the network re-converges on the new topology.

Figure 9:
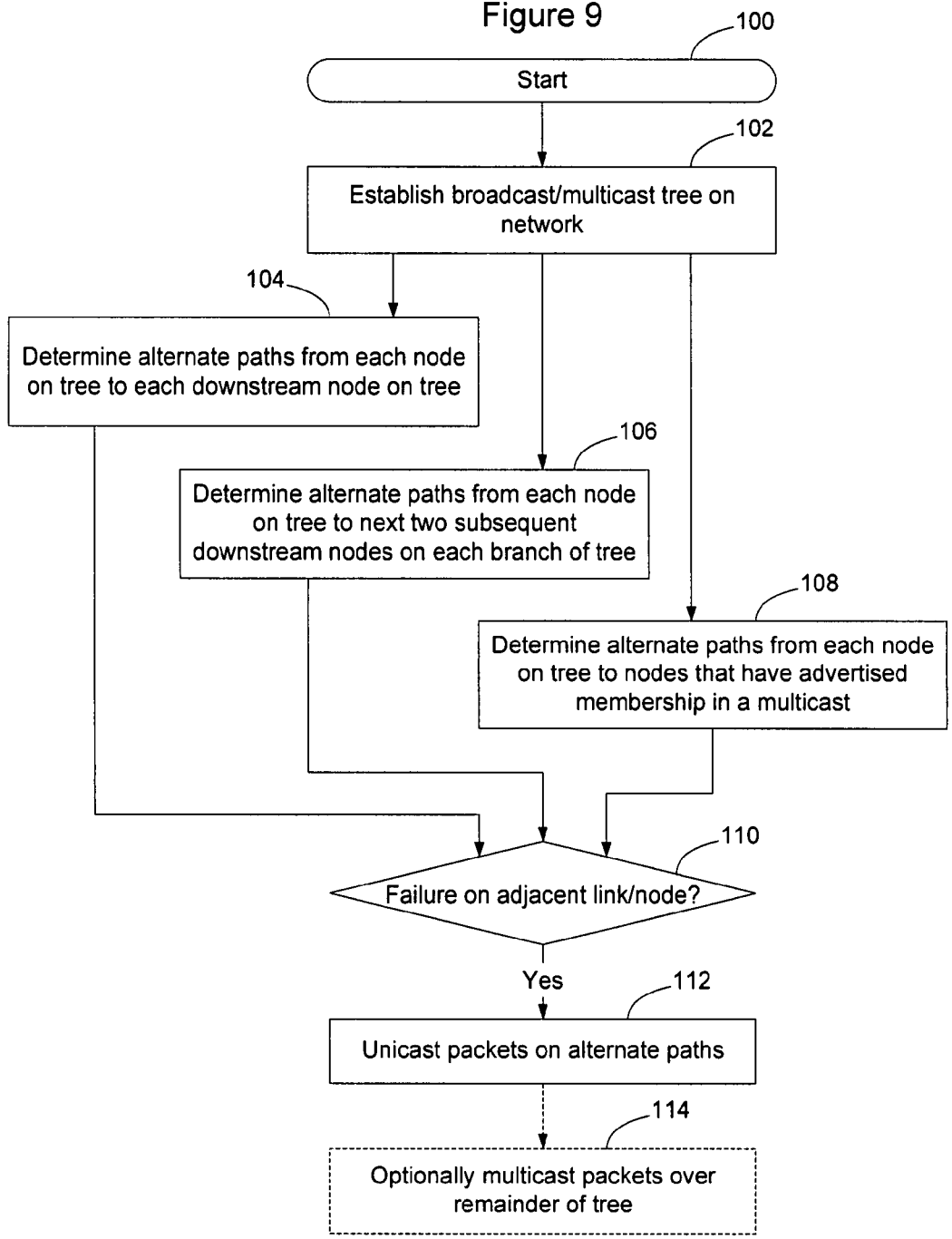
FIG. 9 is a flow chart illustrating a process of determining alternate paths through a routed network for multicast/broadcast trees according to an embodiment of the invention.

FIG. 9 illustrates an example of a process that may be used to implement an embodiment of the invention. In the embodiment shown in FIG. 9, whenever there is a topology change or other change that affects the manner in which multicast trees are calculated on the network (100), the network elements will calculate broadcast/multicast trees (102). As part of the process of installing state for the multicast/broadcast trees, the nodes on the network will determine alternate paths to the downstream nodes. As shown in FIG. 9 and as discussed in greater detail above, the nodes may find alternate network paths to each downstream node on the branches that flows through the failing link/node (104) or may calculate alternate network paths to a select group of downstream nodes (106). In the described embodiment of this nature, the nodes find an alternate network path to the immediate downstream node and to downstream nodes one hop farther down the multicast/broadcast tree from the immediate downstream node. This allows the nodes to find alternate network paths where the failure is a node failure rather than a link failure. Alternatively, as shown in FIG. 9, the node may calculate alternate network paths to downstream end nodes rather than to the intermediate nodes on the multicast/broadcast tree (108). In this embodiment, the upstream node may forward the multicast traffic directly to the downstream end nodes that have advertised membership in the multicast rather than returning the traffic to the multicast tree downstream of the failure.

In the event of a failure on the adjacent link/node (110), the upstream node will unicast PDUs on the pre-computed alternate network paths to the downstream nodes (112). The unicast PDUs may be encapsulated with a unicast header, or the original multicast header may be replaced with the new unicast header. The invention is not limited to the particular manner in which the upstream nodes actually format the PDUs for transmission to the downstream nodes. Once the PDUs reach the downstream nodes they may optionally be multicast on any remaining portion of the multicast/broadcast tree (114).

The process the upstream node uses to calculate alternate paths is the standard alternate path calculation described in U.S. patent application Ser. No. 11/410,747, the content of which is hereby incorporated herein by reference. Since each node is normally required to calculate an alternate path for all destinations on the network, calculation of an alternate network path to reach destinations downstream on a multicast/broadcast tree should not encompass too much additional calculation. However, since the broadcast/multicast may be established as a shortest path tree from a particular source node to all other nodes on the network, forwarding the multicast PDUs to a loop free alternate path will not cause those nodes to forward the multicast/broadcast PDUs to the downstream nodes on the original multicast tree. Accordingly, the multicast PDUs will need to be encapsulated or otherwise provided with a new unicast header or the original multicast header will need to be replaced or modified to form a unicast header before the PDUs are forwarded on the alternate paths so that the packets may be tunneled or otherwise transported through the network.

Figure 10:
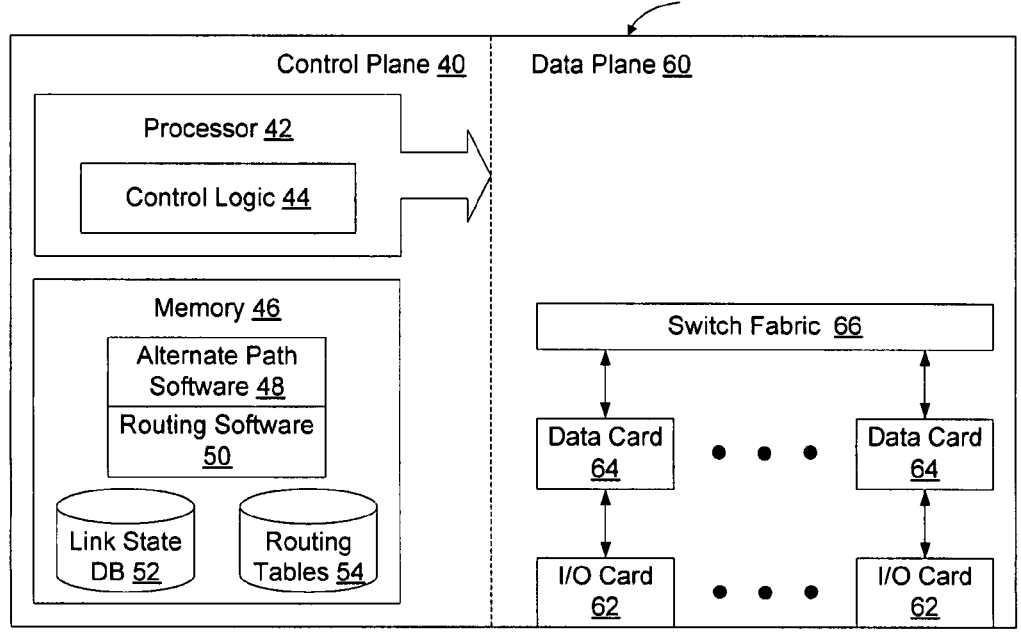
FIG. 10 is a functional block diagram of a network element according to an embodiment of the invention.

FIG. 10 illustrates a network element 12 that may be configured to implement an embodiment of the invention. As shown in FIG. 10, the network element 12 includes a control plane 40 and a data plane 60. The control plane 40 is generally configured to instruct the data plane 60 how to handle data on the network. The data plane 60 is generally configured to handle high speed data traffic, such as packet traffic on an IP network or frames of data on an Ethernet network. For example, the data plane may include one or more I/O cards 62 associated with data service cards 64 interconnected by a switch fabric 66. Routing tables, including alternate paths determined via the alternate path calculation process described herein, may be programmed into the data plane to enable the data plane to handle data on the network. Many data plane architectures may be used in connection with the network element of FIG. 10, and the invention is not limited to a particular data plane architecture selected to implement embodiment of the invention.

The control plane 40 includes a processor 42 containing control logic 44 that is able to be programmed to enable the network element to perform the functions described herein to compute alternate paths through the network. For example, the network element may contain a memory 46 containing software such as alternate path software 48 and routing software 50 configured to enable the network element to select primary and alternate paths to destinations on the network. The memory may also contain one or more tables, such as link state database 52 that contains the data to be used by the routing software 50 and/or alternate path software 48 to enable the network element to perform the requisite computations described herein. The memory may also contain a copy of the current routing tables 54 that have been programmed into the data plane, and other information commonly maintained by the network element to enable it to function on the network. It should be understood that the invention is not limited to a network element configured in the manner discussed above, as numerous other architectures may be used to create a network element.

Although an embodiment of the invention has been described in connection with an implementation in a routed IP network and a routed Ethernet network, the invention is not limited in this manner as it may also be used in other networks where a link state routing protocol is being used. For example, an embodiment of the invention may be used in connection with a routing bridge (RBridge) network running a link state routing protocol such as IS-IS. Additionally, an embodiment of the invention may advantageously be implemented in a network using shortest path bridging, such as the network described in greater detail in U.S. Patent Application No. 11,537,775, filed Oct. 2, 2006, entitled "Provider Link State Bridging," the content of which is hereby incorporated herein by reference. Accordingly, the invention is not limited to implementation on an IP network or in a router, but may also be implemented in other types of network elements such as switches or bridges.

The functions described herein may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of circumventing a local failure on a multicast tree in a link state protocol controlled network in which nodes on the network forward unicast traffic using shortest path forwarding and in which the nodes on the network forward multicast traffic along links included in the multicast tree, the method comprising the steps of:
   determining, by an intermediate node in the multicast tree, a set of downstream nodes on at least one branch of the multicast tree that passes through the intermediate node; and
   calculating a set of loop free neighboring nodes that have shortest paths to the set of downstream nodes that do not pass through the intermediate node;
   encapsulating multicast traffic with a unicast header for each of the set of downstream nodes; and
   forwarding the encapsulated multicast traffic to the set of loop free neighboring nodes to enable the loop free neighboring nodes to forwarding the encapsulated multicast traffic using their shortest path forwarding state toward the set of downstream nodes.

2. The method of claim 1, wherein the set of the downstream nodes comprises all downstream nodes on the multicast tree.

3. The method of claim 1, wherein the set of downstream nodes comprises an adjacent node on the multicast tree and any nodes one hop farther downstream from the adjacent node.

4. The method of claim 1, wherein at least one of the loop-free neighbors is a U-turn neighbor.

5. A method of forwarding multicast traffic by an intermediate node on multicast/broadcast tree, the method comprising the steps of:
   determining, by the intermediate node, a set of downstream nodes on the multicast/broadcast tree that are downstream from the intermediate node on the multicast/broadcast tree;
   calculating, by the intermediate node, a set of nodes on the network that can provide loop-free unicast shortest path forwarding to at least a subset of the downstream nodes, each of the loop-free shortest paths being calculated to not include the intermediate node;
   transmitting, by the intermediate node multicast traffic to the downstream nodes on the multicast/broadcast tree during normal operating conditions; and
   upon occurrence of a failure on a link forming part of the multicast/broadcast tree downstream from the intermediate node, unicasting, by the intermediate node, multicast traffic to each of the subset of downstream nodes by addressing the multicast traffic with a unicast address for each of the subset of downstream nodes and forwarding the unicast addressed multicast traffic to the set of nodes on the network that calculated to be able to provide loop-free unicast shortest path forwarding to the subset of the downstream nodes.

6. The method of claim 5, wherein the step of transmitting multicast traffic comprises transmitting multicast traffic over at least one link connected to the intermediate node and associated with the multicast/broadcast tree to enable multicast traffic to be passed to the downstream nodes.

7. The method of claim 5, wherein the multicast traffic comprises protocol data units addressed using a multicast destination address, and wherein the step of unicasting multicast traffic on each unicast path comprises replacing the multicast destination address with a unicast destination address of at least one of the downstream nodes associated with the unicast path.

8. The method of claim 5, wherein the multicast traffic comprises protocol data units addressed using a multicast destination address, and wherein the step of unicasting multicast traffic on each unicast path comprises encapsulating the protocol data units with a header containing a unicast destination address of at least one of the downstream nodes associated with the unicast path.

9. The method of claim 5, wherein the subset of the downstream nodes comprises all downstream nodes.

10. The method of claim 5, wherein the subset of downstream nodes comprises an adjacent node on the multicast/broadcast tree and any nodes one hop farther downstream from the adjacent node.

11. The method of claim 5, wherein the subset of downstream nodes comprises a set of nodes that have advertised membership in a multicast to cause them to be added to the broadcast/multicast tree.

12. The method of claim 5, wherein the set of nodes on the network that can provide loop-free unicast shortest path forwarding includes at least one node that is a U-turn neighbor.

13. A method of forwarding multicast traffic by a node on a link state protocol controlled network, the node being configured to forward multicast traffic around a failure on a link over which a branch of a multicast tree extends, the method comprising the steps of:
   determining, by the node, a set of downstream nodes on the branch of the multicast tree that extends over the link that is experiencing failure; and
   tunneling, by the node, multicast traffic as unicast traffic to a set of neighboring nodes having loop free unicast shortest path forwarding state to the set of downstream nodes on the branch that extends over the link that is experiencing failure.

14. The method of claim 13, wherein the step of tunneling comprises replacing multicast headers associated with the multicast traffic with unicast headers.

15. The method of claim 14, wherein the unicast headers are unique for each downstream node.

16. The method of claim 14, wherein the step of tunneling multicast traffic comprises transmitting multiple copies of data associated with the multicast traffic, at least one copy of said data being transmitted to each node of the set of downstream nodes.

17. The method of claim 14, wherein the step of tunneling comprises encapsulating multicast traffic with a unique unicast header for each node of the set of downstream nodes, and transmitting multiple copies of the multicast data, each copy of the multicast data being encapsulated with one of the unique unicast headers.

* * * * *